United States Patent
Mitsuda et al.

(10) Patent No.: US 12,247,576 B2
(45) Date of Patent: Mar. 11, 2025

(54) IMPELLER AND PUMP

(71) Applicant: MITSUBISHI HEAVY INDUSTRIES, LTD., Tokyo (JP)

(72) Inventors: Kimihiko Mitsuda, Tokyo (JP); Yuki Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 30 days.

(21) Appl. No.: 17/610,887

(22) PCT Filed: Feb. 28, 2020

(86) PCT No.: PCT/JP2020/008398
§ 371 (c)(1),
(2) Date: Nov. 12, 2021

(87) PCT Pub. No.: WO2020/240955
PCT Pub. Date: Dec. 3, 2020

(65) Prior Publication Data
US 2022/0205452 A1 Jun. 30, 2022

(30) Foreign Application Priority Data
May 31, 2019 (JP) .................... 2019-102534

(51) Int. Cl.
*F04D 29/24* (2006.01)
*F04D 13/08* (2006.01)
*F04D 29/048* (2006.01)

(52) U.S. Cl.
CPC .......... *F04D 29/242* (2013.01); *F04D 13/08* (2013.01); *F04D 29/048* (2013.01)

(58) Field of Classification Search
CPC .......... F04D 1/04; F04D 13/08; F04D 29/183; F04D 29/24; F04D 29/242; E21B 23/0419; E21B 43/128
See application file for complete search history.

(56) References Cited

U.S. PATENT DOCUMENTS

| | | | |
|---|---|---|---|
| 4,846,152 A | | 7/1989 | Wampler et al. |
| 5,549,447 A | * | 8/1996 | Bevington .......... F04D 13/0646 415/115 |

(Continued)

FOREIGN PATENT DOCUMENTS

JP 4-124478 4/1992

OTHER PUBLICATIONS

International Search Report issued on Apr. 28, 2020, in International (PCT) Application No. PCT/JP2020/008398, with English-language machine translation.

(Continued)

*Primary Examiner* — David E Sosnowski
*Assistant Examiner* — Jason G Davis
(74) *Attorney, Agent, or Firm* — Wenderoth, Lind & Ponack, L.L.P.

(57) ABSTRACT

An impeller includes: main vanes which are provided in a front stage section of a hub so as to connect an outer surface of the front stage section and an inner surface of a shroud, and are arranged at intervals in a circumferential direction of the hub, wherein the main vanes generate an oblique flow of crude oil; and splitter vanes which are provided in a rear stage section of the hub so as to be connected to an outer surface of the rear stage section, and are arranged at intervals in the circumferential direction, wherein the splitter vanes generate an axial flow of the crude oil.

10 Claims, 4 Drawing Sheets

(56) References Cited

U.S. PATENT DOCUMENTS

| | | | |
|---|---|---|---|
| 6,790,016 B2* | 9/2004 | Chiang | F04D 29/2288 |
| | | | 415/72 |
| 8,240,976 B1* | 8/2012 | Kamio | F04D 29/448 |
| | | | 415/1 |
| 9,482,232 B2* | 11/2016 | Andersen | F04D 29/628 |
| 9,624,930 B2* | 4/2017 | Gahlot | F04D 7/045 |
| 9,829,001 B2* | 11/2017 | Jayaram | F04D 29/448 |
| 2019/0017518 A1 | 1/2019 | Brown et al. | |

OTHER PUBLICATIONS

Written Opinion issued on Apr. 28, 2020, in International (PCT) Application No. PCT/JP2020/008398, with English-language machine translation.

\* cited by examiner

IMPELLER AND PUMP

TECHNICAL FIELD

The present invention relates to an impeller and a pump.

Priority is claimed on Japanese Patent Application No. 2019-102534, filed May 31, 2019, the content of which is incorporated herein by reference.

BACKGROUND ART

When pumping crude oil from underground, for example, a pump disclosed in Patent Document 1 is used.

As one of such pumps, there is known a crude oil mining pump including a production pipe which is formed in a tubular shape extending in the vertical direction and supports a motor stator at a lower portion and an inner element which extends in the vertical direction and is inserted into the production pipe.

The inner element includes an electric motor which includes a motor shaft extending in the vertical direction, a pump shaft, a plurality of impellers, a magnetic component, and a motor stator.

The pump shaft extends in the vertical direction and the lower end thereof is connected to the upper end of the motor shaft. The plurality of impellers are provided on an outer peripheral surface of the pump shaft and are arranged at intervals in the vertical direction. The magnetic component is provided on an outer peripheral surface of the motor shaft and is disposed to face the motor stator.

In the crude oil mining pump with the above-described configuration, the plurality of impellers rotate together with the pump shaft by the electric motor so that crude oil is pumped from underground to above ground.

Further, in the crude oil mining pump, it is preferable that the radial size of the pump is not large.

CITATION LIST

Patent Document

Patent Document 1: Japanese Unexamined Patent Application, First Publication No. H04-124478

SUMMARY OF INVENTION

Technical Problem

By the way, crude oil pumped from underground may contain air bubbles made of natural gas.

When crude oil containing air bubbles is introduced into the impeller, air bubbles can accumulate in the impeller and the pump lift of the impeller can be decreased.

Here, an object of the present invention is to provide an impeller and a pump capable of increasing the pump lift without increasing a radial size of the pump.

Solution to Problem

In order to solve the above-described problems, an impeller according to an aspect of the present invention is an impeller included in a pump used for pumping crude oil from underground. The impeller includes: a hub which is formed in an circular shape centered on an axis, includes a rear stage section and a front stage section inclined in a direction moving closer to the axis from the rear stage section, and is rotatable around the axis; main vanes which are formed on the front stage section so as to be in connection with an outer surface of the front stage section, and are arranged at intervals in the circumferential direction of the hub, the main vanes generating an oblique flow of the crude oil; and splitter vanes which are formed on the rear stage section so as to be in connection with an outer surface of the rear stage section, and are arranged at intervals in the circumferential direction of the hub, the splitter vanes generating an axial flow of the crude oil.

According to the present invention, since the impeller includes the main vanes which are formed on the front stage section of the hub and are arranged at intervals in the circumferential direction of the hub to generate the oblique flow and the splitter vanes which are formed on the rear stage section of the hub and are arranged at intervals in the circumferential direction of the hub to generate the axial flow, it is possible to enlarge the outer diameter of the splitter vane without enlarging the outer diameter of the impeller compared to a case in which the splitter vanes are provided only in the front stage section of the hub. Accordingly, it is possible to improve the pump lift by the impeller.

That is, it is possible to improve the pump lift by the impeller without enlarging the outer diameter of the impeller.

Further, in the impeller according to an aspect of the present invention, the splitter vanes may be positioned so as to be shifted with respect to the main vanes in the circumferential direction of the hub.

In this way, since the splitter vanes are positioned so as to be shifted with respect to the main vanes in the circumferential direction of the hub, it is possible to separate an area in which the function of the main vanes is exhibited from an area in which the function of the splitter vanes is exhibited.

Further, in the impeller according to an aspect of the present invention, the number of the splitter vanes may be larger than the number of the main vanes.

In this way, since the number of the splitter vanes is larger than the number of the main vanes, it is possible to sufficiently ensure the pump lift due to the impeller.

Further, in the impeller according to an aspect of the present invention, the outer surface of the rear stage section may include a maximum position in which an outer diameter of the hub is a maximum value, and the outer surface of the front stage section may be formed so that the outer diameter of the hub is reduced in a direction from the rear stage section to the axis.

In this way, since the rear stage section in which the splitter vanes are formed includes the maximum position in which the outer diameter of the hub is the maximum value, it is possible to generate the axial flow of the crude oil by the splitter vanes.

Further, since the front stage section in which the main vanes are formed has an outer diameter smaller than that of the rear stage section and the outer diameter of the hub is reduced in a direction from the rear stage section to the axis, it is possible to generate the oblique flow of the crude oil by the main vanes.

In order to solve the above-described problems, an impeller according to an aspect of the present invention is an impeller included in a pump used for pumping crude oil from underground. The impeller includes: a hub which is formed in an circular shape centered on an axis, includes a rear stage section and a front stage section inclined in a direction moving closer to the axis from the rear stage section, and is rotatable around the axis; main vanes which are formed from the front stage section to the rear stage section so as to be in connection with an outer surface of the hub, and are arranged at intervals in the circumferential direction of the hub, the main vanes generating an oblique flow of the crude oil; and splitter vanes which are formed on the rear stage section so as to be in connection with an outer surface of the rear stage section, and are arranged at intervals in the circumferential direction of the hub, the splitter vanes generating an axial flow of the crude oil.

According to the impeller of an aspect of the present invention, since the impeller includes the main vanes which are provided from the front stage section to the rear stage section so as to be in connection with the outer surface of the hub, are arranged at intervals in the circumferential direction of the hub to generate the oblique flow of the crude oil; and splitter vanes which are provided in the rear stage section so as to be in connection with the outer surface of the rear stage section, are arranged at intervals in the circumferential direction of the hub to generate the axial flow of the crude oil, it is possible to enlarge the outer diameter of the splitter vane without enlarging the outer diameter of the impeller compared to a case in which the splitter vanes are provided in the front stage section of the hub. Accordingly, it is possible to suppress a decrease in the pump lift due to the impeller.

Further, in the impeller according to an aspect of the present invention, the number of the splitter vanes may be larger than the number of the main vanes.

In this way, since the number of the splitter vanes is larger than the number of the main vanes, it is possible to sufficiently ensure the pump lift by the impeller.

Further, in the impeller according to an aspect of the present invention, the outer surface of the rear stage section may include a maximum position in which an outer diameter of the hub is a maximum value, and the outer surface of the front stage section may be formed so that the outer diameter of the hub is reduced in a direction from the rear stage section to the axis.

In this way, since the rear stage section in which the splitter vanes are formed includes the maximum position in which the outer diameter of the hub is the maximum value, it is possible to generate the axial flow of the crude oil by the splitter vanes.

Further, since the front stage section in which the main vanes are formed has an outer diameter smaller than that of the rear stage section and the outer diameter of the hub is reduced in a direction from the rear stage section to the axis, it is possible to generate the oblique flow of the crude oil by the main vanes.

In order to solve the above-described problems, a pump according to an aspect of the present invention is a pump for pumping crude oil from underground. The pump includes: an inner element which includes a plurality of the impeller according to any one of the above impellers, a pump shaft extending in a vertical direction and having the plurality of the impellers arranged in the vertical direction, a motor shaft having an upper end connected to a lower end of the pump shaft and extending below the pump shaft, a magnetic component provided on an outer peripheral surface of the motor shaft, and a pump stator formed in a tubular shape accommodating the plurality of impellers therein and extending in the same direction as the pump shaft; a production pipe which is formed in a tubular shape extending in the vertical direction, accommodates the inner element therein, and supports the inner element; and a motor stator which is disposed in a lower portion of the production pipe and included in the electric motor together with the magnetic component.

According to the pump of an aspect of the present invention, since the pump is provided with the plurality of impellers capable of improving the pump lift, a stable operation of the pump can be performed.

Advantageous Effects of Invention

It is possible to improve the pump lift by the impeller without increasing the radial size of the pump.

DESCRIPTION OF EMBODIMENTS

Hereinafter, embodiments of the present invention will be described in detail with reference to the drawings.

First Embodiment

Figure 1:
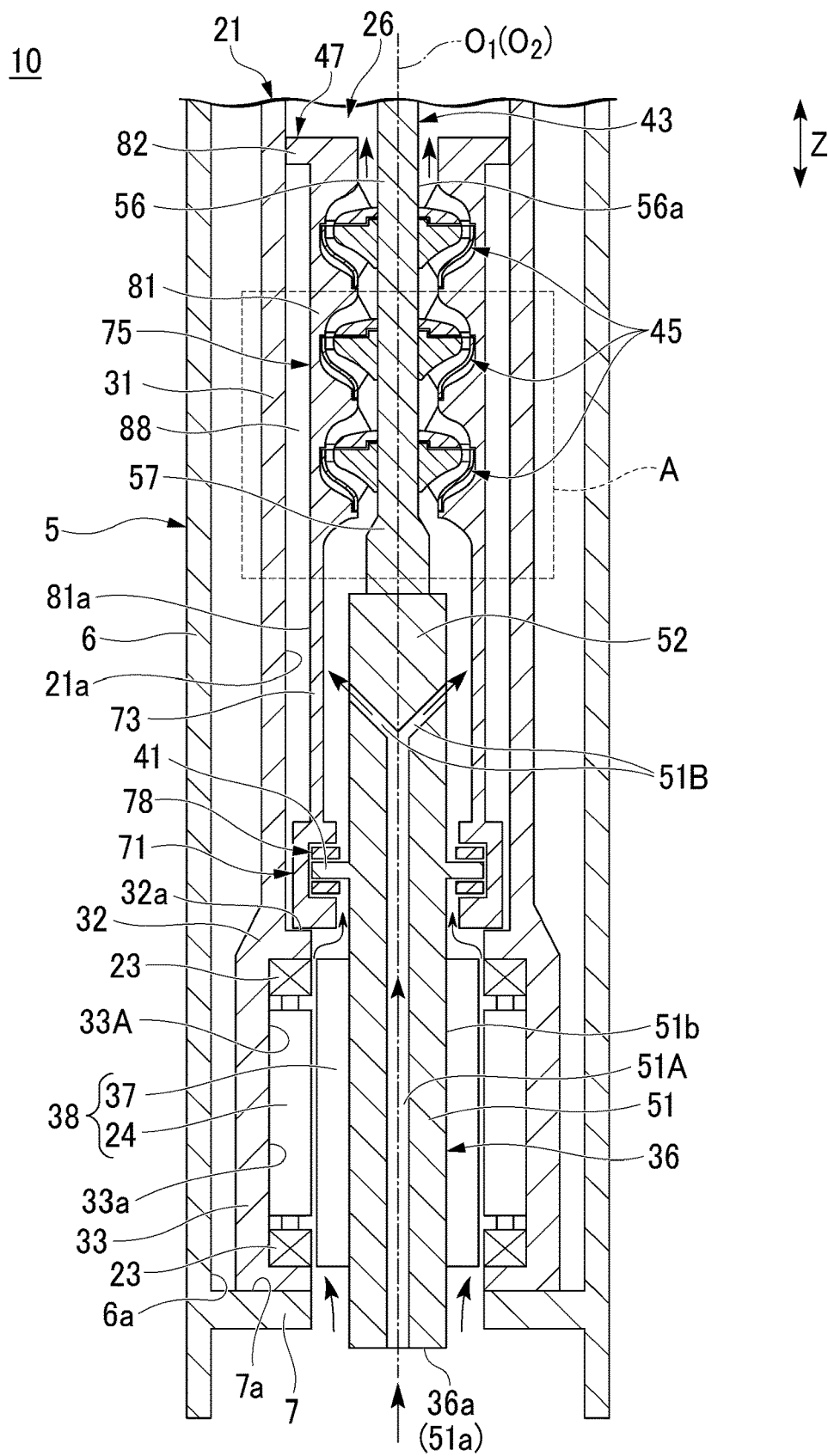
FIG. 1 is a longitudinal sectional view showing a schematic configuration of a pump according to a first embodiment of the present invention.
Figure 2:
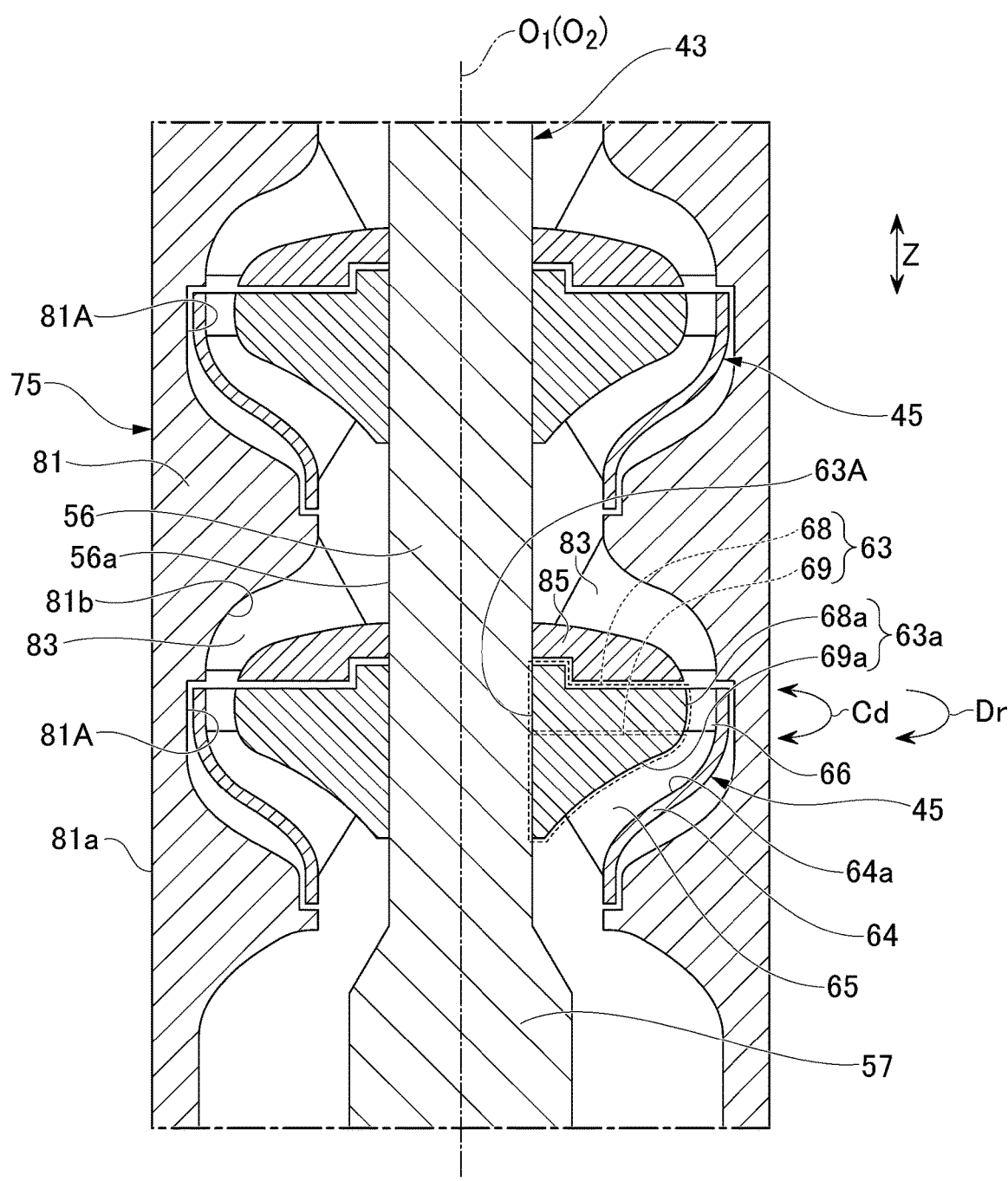
FIG. 2 is an enlarged longitudinal sectional view of a portion surrounded by an area A in the pump shown in FIG. 1.
Figure 3:
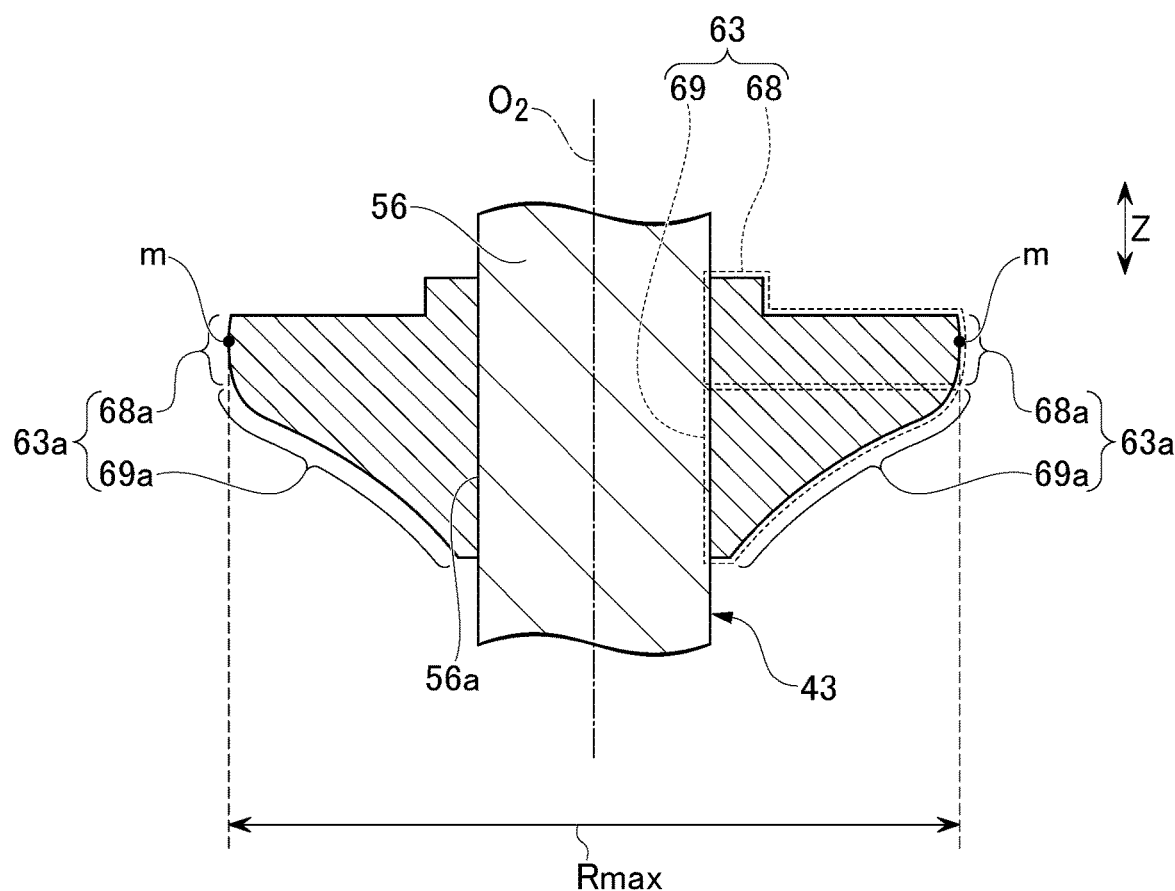
FIG. 3 is an enlarged longitudinal sectional view of a hub constituting an impeller shown in FIG. 2.

A pump 10 according to a first embodiment will be described with reference to FIG. 1 to FIG. 4. In FIG. 1 to FIG. 3, the Z direction indicates the vertical direction. In FIG. 1, A indicates an area, $O_1$ indicates an axis (hereinafter, referred to as an "axis $O_1$") of a production pipe 21, and $O_2$ indicates an axis (hereinafter, referred to as an "axis $O_2$") of an inner element 26. FIG. 1 also shows an excavation pipe 5 which is not a component of the pump 10.

Figure 4:
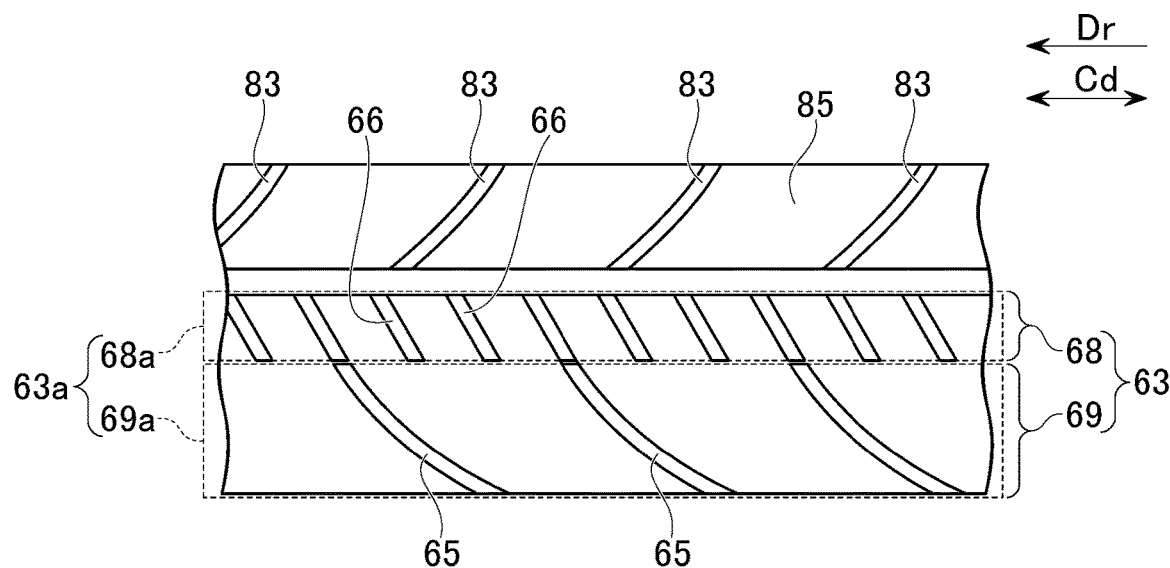
FIG. 4 is a side view in which a hub, a main vane, a splitter vane, a partition wall portion, and a vane shown in FIG. 2 are viewed from the side and are developed in the lateral direction.

In FIG. 2 and FIG. 4, Dr indicates a direction (hereinafter, referred to as a "Dr direction") in which an impeller 45 rotates and Cd indicates a circumferential direction (hereinafter, referred to a "circumferential direction Cd") of a hub 63.

In FIG. 3, Rmax indicates a maximum value (hereinafter, referred to as a "maximum value Rmax") of the outer diameter of the hub and m indicates a position (hereinafter, referred to as a "maximum position m") on an outer surface 68a of a rear stage section 68 in which the maximum value Rmax is obtained.

In FIG. 1 to FIG. 4, the same components are designated by the same reference numerals. The arrows shown in FIG. 1 indicate the direction in which crude oil pumped from underground flows.

The pump 10 is accommodated inside the tubular excavation pipe 5. The excavation pipe 5 includes a tubular portion 6 which extends in the Z direction and a ring-shaped support portion 7 which protrudes inward in the radial direction from the inner peripheral surface of the lower end portion of the tubular portion 6.

The pump 10 includes the production pipe 21, a radial bearing 23, a motor stator 24, and an inner element 26.

The production pipe 21 is formed in a tubular shape and extends in the Z direction. The production pipe 21 includes a tubular portion 31, a support portion 32, and a motor stator accommodating portion 33.

The tubular portion 31 extends in the Z direction and constitutes the upper portion side of the production pipe 21.

The support portion 32 is formed in a ring shape and is provided between the tubular portion 31 and the motor stator accommodating portion 33. The support portion 32 connects the tubular portion 31 and the motor stator accommodating portion 33. The support portion 32 protrudes inward in the radial direction in relation to the tubular portion 31 and the motor stator accommodating portion 33 and protrudes outward in the radial direction in relation to the tubular portion 31.

In the support portion 32, a portion protruding inward in relation to the tubular portion 31 includes an upper surface 32a which supports a lower end of a pump stator 47.

The motor stator accommodating portion 33 is formed in a tubular shape and extends in the Z direction.

The motor stator accommodating portion 33 constitutes the lower portion side of the production pipe 21. A ring-shaped accommodation space 33A is formed inside the motor stator accommodating portion 33. The lower end of the motor stator accommodating portion 33 is supported by an upper surface 7a of the support portion 7.

The radial bearing 23 is disposed at the upper end portion and the lower end portion of the accommodation space 33A.

The motor stator 24 is fixed to an inner peripheral surface 33a of the motor stator accommodating portion 33 that defines the outer periphery of the accommodation space 33A.

The inner element 26 includes a motor shaft 36, a magnetic component 37, a thrust collar 41, a pump shaft 43, a plurality of the impellers 45, and the pump stator 47.

The motor shaft 36 includes a flow path forming shaft portion 51 and a first connection portion 52.

The flow path forming shaft portion 51 is a shaft portion which extends in the Z direction and its axis is aligned to the axis $O_2$. The flow path forming shaft portion 51 includes a lower end surface 51a (a lower end surface 36a of the motor shaft 36) which reaches crude oil pumped to above ground.

The flow path forming shaft portion 51 includes a first flow path 51A and a plurality of second flow paths 51B.

The first flow path 51A extends in the Z direction. In the first flow path 51A, the lower end reaches the lower end surface 51a and the upper end is disposed below the first connection portion 52. The first flow path 51A is a flow path which guides crude oil upward from the lower end surface Ma.

In the plurality of second flow paths 51B, the lower ends are connected to the upper end of the first flow path 51A. The plurality of second flow paths 51B extend obliquely upward and the upper ends are exposed from an outer peripheral surface 51b of the flow path forming shaft portion 51.

Crude oil derived from the plurality of second flow paths 51B is guided upward (to above ground) by the plurality of impellers 45 arranged above the motor shaft 36.

The first connection portion 52 constitutes the upper end of the motor shaft 36. The first connection portion 52 is connected to the lower end of the pump shaft 43 in an attachable and detachable state.

The magnetic component 37 is fixed to the outer peripheral surface 51b of the flow path forming shaft portion 51.

The magnetic component 37 is disposed to face the motor stator 24 in the radial direction of the flow path forming shaft portion 51. The magnetic component 37 and the motor stator 24 constitute an electric motor 38.

The thrust collar 41 is fixed to the flow path forming shaft portion 51. The thrust collar 41 is formed in a ring shape protruding outward in the radial direction.

The pump shaft 43 is disposed above the flow path forming shaft portion 51 so that its axis is aligned to the axis $O_2$.

The pump shaft 43 includes a pump shaft main body 56 and a second connection portion 57.

The pump shaft main body 56 extends in the Z direction and is formed in a columnar shape. The outer diameter of the pump shaft main body 56 is constant in the Z direction.

The second connection portion 57 is disposed at the lower end of the pump shaft main body 56. The second connection portion 57 is integrally formed with the lower end of the pump shaft main body 56. The second connection portion 57 extends downward from the lower end of the pump shaft main body 56.

The second connection portion 57 is connected to the first connection portion 52 that constitutes the upper end of the motor shaft 36.

The plurality of impellers 45 are provided on the outer peripheral surface 56a of the pump shaft main body 56. The plurality of impellers 45 are arranged at intervals in the Z direction.

The impeller 45 includes a hub 63, a shroud 64, a plurality of main vanes 65, and a plurality of splitter vanes 66. The axis of the impeller 45 is aligned to the axis $O_2$. The impeller 45 rotates around the axis $O_2$.

The hub 63 is formed in a circular shape centered on the axis $O_2$. The hub 63 is rotatable around the axis $O_2$. The hub 63 includes a pass-through portion 63A, a rear stage section 68, a front stage section 69, and an outer surface 63a.

The pass-through portion 63A is formed so as to pass through the center portion of the hub 63 in the Z direction. The pump shaft main body 56 is inserted into the pass-through portion 63A so that the outer surface 63a faces downward. The hub 63 is fixed to the pump shaft main body 56.

The hub 63 is fixed to the pump shaft main body 56 while the pump shaft main body 56 is inserted into the pass-through portion 63A.

The rear stage section 68 constitutes a portion of the hub 63 located on the downstream side in the crude oil flow direction. The rear stage section 68 is formed to have a diameter larger than that of the front stage section. The rear stage section 68 includes the outer surface 68a which faces the shroud 64. The outer surface 68a includes the maximum position in in which the outer diameter of the hub 63 becomes the maximum value Rmax.

The front stage section 69 constitutes a portion of the hub 63 located on the upstream side in the crude oil flow direction. The front stage section 69 is integrally formed with the rear stage section 68.

The front stage section 69 is formed in a shape in which an outer diameter of the front stage section 69 is smaller than the outer diameter of the rear stage section 68 and the outer diameter of the hub 63 is reduced in a direction from the rear stage section 68 to the axis $O_2$. The front stage section 69 is inclined in a direction moving closer to the axis $O_2$. The front stage section 69 includes a curved outer surface 69a. The outer surface 69a is a surface which is integrally formed with the outer surface 68a.

The outer surface 63a includes the outer surface 68a of the rear stage section 68 and the outer surface 69a of the front stage section 69.

The shroud 64 is formed in a circular-cylindrical shape centered on the axis $O_2$.

The shroud 64 is disposed outside the hub 63 with a gap interposed therebetween. The shroud 64 includes an inner surface 64a which faces the outer surface 63a of the hub 63.

The plurality of main vanes 65 are provided only in the front stage section 69. The plurality of main vanes 65 are arranged at intervals in the circumferential direction Cd. The plurality of main vanes 65 connect the outer surface 69a of the front stage section 69 and the inner surface 64a of the shroud 64.

A gap between the main vanes 65 arranged at adjacent positions in the circumferential direction Cd functions as a flow path through which crude oil flows. This flow path generates an oblique flow of the crude oil.

The plurality of main vanes 65 with the above-described configuration have a function of boosting crude oil.

For example, the number of the main vanes 65 may be decreased with respect to that of the splitter vanes 66.

By decreasing the number of the main vanes 65 in this way, it is possible to widen the distance between the main vanes 65 and suppress the accumulation of air bubbles contained in the crude oil.

The plurality of splitter vanes 66 are provided only in the rear stage section 68. The plurality of splitter vanes 66 are arranged at intervals in the circumferential direction Cd. The plurality of splitter vanes 66 connect the outer surface 68a of the rear stage section 68 including the maximum position in and the inner surface 64a of the shroud 64.

That is, the plurality of splitter vanes 66 are provided only on the outer surface 68a of the rear stage section 68 including the maximum position m in the outer surface 63a of the hub 63.

A gap between the splitter vanes 66 arranged at the adjacent positions in the circumferential direction Cd functions as a flow path through which crude oil flows.

This flow path generates an axial flow of the crude oil.

It is preferable that the radial width of the exit of the flow path defined by the splitter vane 66 is the same as, for example, the radial width of the entrance of the flow path defined by a vane 83.

The splitter vane 66 can disintegrate gas bubbles contained in crude oil (fluid).

The number of the main vanes 65 in the small diameter portion in the vicinity of the entrance of the impeller 45 may be decreased and relatively the number of the splitter vanes 66 in the large diameter portion in the vicinity of the exit of the impeller 45 may be increased.

With such a configuration, it is possible to ensure a dimension between the vanes in the circumferential direction Cd and to highly efficiently increase the pressure.

As described above, since the splitter vane 66 is provided only on the outer surface 68a of the rear stage section 68 including the maximum position m, it is possible to increase the outer diameter of the splitter vane 66 without increasing the outer diameter of the impeller 45 (the outer diameter of the shroud 64) compared to a case in which the splitter vane is provided only in the front stage section 69 of the hub 63.

Accordingly, it is possible to improve the pump lift by the impeller 45.

That is, it is possible to improve the pump lift by the impeller 45 without enlarging the outer diameter of the impeller 45.

The number of the splitter vanes 66 may be larger than, for example, the number of the main vanes 65. Specifically, the number of the splitter vanes 66 can be set, for example, in the range of 2 to 3 times the number of the main vanes 65.

In this way, since the number of the splitter vanes 66 is larger than the number of the main vanes 65, it is possible to ensure the pump lift in a sufficient value.

Since the plurality of impellers 45 with the above-described configuration rotate together with the pump shaft main body 56, these impellers function as a centrifugal pump which guides crude oil derived from the plurality of second flow paths 51B upward (above ground).

Then, the pressure of crude oil heading to the ground increases as it passes through the impeller 45. Therefore, the pressure of crude oil increases when passing through the impeller 45.

The pump stator 47 is a tubular member that extends in the Z direction and is accommodated inside the production pipe 21.

The pump stator 47 includes a load receiving portion 71, a connection pipe 73, and a pump casing 75.

The load receiving portion 71 constitutes the lower portion of the pump stator 47. The load receiving portion 71 includes a thrust bearing 78 which receives a force in a thrust direction of the thrust collar 41.

The lower end of the load receiving portion 71 comes into contact with the upper surface 32a of the support portion 32 due to the own weight of the inner element 26. Accordingly, the inner element 26 is supported by the production pipe 21.

The connection pipe 73 is a tubular member that extends in the Z direction and accommodates the motor shaft 36. A tubular flow path which guides crude oil to the impeller 45 disposed on the bottom among the plurality of impellers 45 is formed between the connection pipe 73 and the motor shaft 36.

The connection pipe 73 is connected to the upper end of the load receiving portion 71 and the upper end is connected to the lower end of the pump casing 75. Accordingly, the connection pipe 73 connects the pump casing 75 and the load receiving portion 71.

The pump casing 75 includes a pump casing main body 81, a fitting portion 82, a vane 83, and a partition wall portion 85.

The pump casing main body 81 is a tubular member and is provided on the connection pipe 73. The pump casing main body 81 surrounds an area provided with the plurality of impellers 45 in the pump shaft main body 56 and the periphery of the plurality of impellers 45.

A plurality of spaces 81A for accommodating the impellers 45 are formed inside the pump casing main body 81. The plurality of spaces 81A are arranged at intervals in the Z direction.

The pump casing main body 81 is accommodated inside the production pipe 21. A cylindrical gap 88 is formed between an outer peripheral surface 81a of the pump casing main body 81 and an inner peripheral surface 21a of the production pipe 21.

The fitting portion 82 is provided at the upper end of the pump casing main body 81. The fitting portion 82 is a ring-shaped member that protrudes outward in the radial direction of the pump casing main body 81. The fitting portion 82 is fitted into the production pipe 21.

The vane 83 is provided in a portion that defines the upper portion of each space 81A in the inner peripheral surface 81b of the pump casing main body 81. A plurality of the vanes 83 are arranged at intervals in the circumferential direction Cd.

The partition wall portion 85 is a circular member that surrounds the pump shaft main body 56 and is provided inside the plurality of vanes 83 arranged in the respective spaces 81A. The partition wall portion 85 is disposed above the hub 63. The partition wall portion 85 is supported by the plurality of vanes 83.

The shape of the lower portion of the partition wall portion 85 corresponds to the shape of the upper portion of the hub 63. A gap is formed between the partition wall portion 85, the pump shaft main body 56, and the hub 63.

A space defined by the inner peripheral surface of the pump casing main body 81, the partition wall portion 85, and the adjacent vanes 83 functions as a flow path through which crude oil flows via the impeller 45.

According to the impeller 45 of the first embodiment, since the splitter vane 66 is provide only on the outer surface 68a of the rear stage section 68 including the maximum position m, it is possible to increase the outer diameter of the splitter vane 66 without increasing the outer diameter of the impeller 45 (the outer diameter of the shroud 64) compared to a case in which the splitter vane is provided only in the front stage section 69 of the hub 63. Accordingly, it is possible to improve the pump lift by the impeller 45.

That is, it is possible to improve the pump lift by the impeller 45 without enlarging the outer diameter of the impeller 45.

Further, according to the pump 10 of the first embodiment, since the pump 10 is provided with the plurality of impellers 45 capable of improving the pump lift, a stable operation of the pump 10 can be performed.

Additionally, the plurality of splitter vanes 66 may be positioned, for example, so as to be shifted with respect to the main vanes 65 in the circumferential direction Cd.

In this way, since the splitter vanes 66 are positioned so as to be shifted with respect to the main vanes 65 in the circumferential direction Cd, it is possible to separate an area in which the function of the main vane 65 is exhibited and an area in which the function of the splitter vane 66 is exhibited.

Second Embodiment

Figure 5:
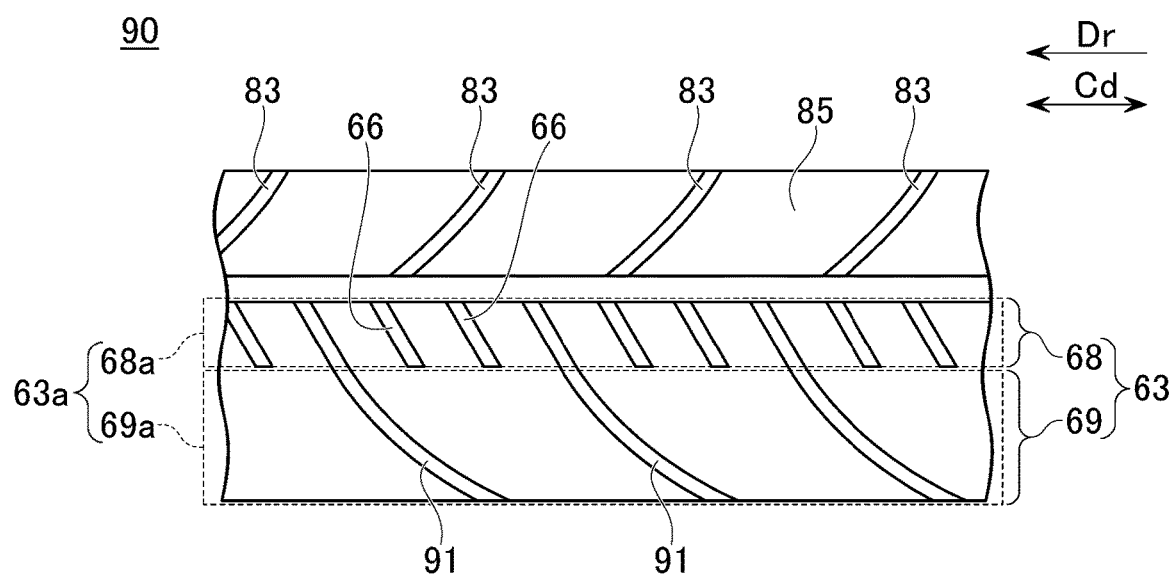
FIG. 5 is a side view in which a hub, a main vane, a splitter vane, a partition wall portion, and a vane in an impeller according to a second embodiment of the present invention are viewed from the side and are developed in the lateral direction.

An impeller 90 of a second embodiment will be described with reference to FIG. 5. In FIG. 5, the same components as those of the structure shown in FIG. 4 are designated by the same reference numerals.

The impeller 90 has the same configuration as that of the impeller 45 except that a plurality of main vanes 91 are provided instead of the plurality of main vanes 65 constituting the impeller 45 of the first embodiment.

The plurality of main vanes 91 have the same configuration as that of the main vane 65 except that the main vane is provided from the front stage section 69 to the rear stage section 68.

Also in the impeller 90 of the second embodiment with such a configuration, since the splitter vane 66 is provided only on the outer surface 68a of the rear stage section 68 including the maximum position in, it is possible to improve the pump lift by the impeller 90 without enlarging the outer diameter of the impeller 90.

Although the preferred embodiments of the present invention have been described in detail above, the present invention is not limited to such specific embodiments and various modifications and changes can be made in the scope of the spirit of the present invention described in claims.

For example, in the first and second embodiments, the impellers 45 and 90 including the shroud 64 have been described as an example, but the present invention can be also applied to an open type impeller (open impeller) that does not include the shroud 64.

INDUSTRIAL APPLICABILITY

According to the present invention, it is possible to improve the pump lift by the impeller without increasing the radial size of the pump.

REFERENCE SIGNS LIST

5 Excavation pipe
6, 31 Tubular portion
6a, 21a, 33a, 81b Inner peripheral surface
7, 32 Support portion
7a, 32a Upper surface
10 Pump
21 Production pipe
23 Radial bearing
24 Motor stator
26 Inner element
31 Tubular portion
Motor stator accommodating portion
33A Accommodation space
36 Motor shaft
36a, 51a Lower end surface
37 Magnetic component
38 Electric motor
41 Thrust collar
43 Pump shaft
45, 90 Impeller
47 Pump stator
51 Flow path forming shaft portion
51A First flow path
51b, 56a, 81a Outer peripheral surface
51B Second flow path
52 First connection portion
56 Pump shaft main body
57 Second connection portion
63 Hub
63a, 68a, 69a Outer surface
63A Pass-through portion
64 Shroud
64a Inner surface
65, 91 Main vane
66 Splitter vane
68 Rear stage section
69 Front stage section
71 Load receiving portion
73 Connection pipe
75 Pump casing
78 Thrust bearing
81 Pump casing main body
81A Space
82 Fitting portion
83 Vane
85 Partition wall portion
88 Gap
A Area
D Direction
m Maximum position
Rmax Maximum value
Cd Circumferential direction
$O_1$, $O_2$ Axis

The invention claimed is:

1. A pump for pumping crude oil from underground, the pump comprising:
    an inner element which includes a plurality of impellers, a pump shaft extending in a vertical direction and having the plurality of the impellers arranged in the vertical direction, a motor shaft having an upper end connected to a lower end of the pump shaft and extending below the pump shaft, a magnetic component provided on an outer peripheral surface of the motor shaft, and a pump stator formed in a tubular shape accommodating the plurality of impellers therein and extending in the same direction as the pump shaft;
    a production pipe formed in a tubular shape extending in the vertical direction, accommodates the inner element therein, and supports the inner element; and
    a motor stator disposed in a lower portion of the production pipe and included in an electric motor together with the magnetic component,
    wherein each of the impellers comprises:
    a hub which is formed in a circular shape centered on an axis, includes a rear stage section and a front stage section inclined in a direction from the rear stage section to the axis, and is rotatable around the axis;
    main vanes which are formed on the front stage section so as to be in connection with an outer surface of the front stage section, and are arranged at intervals in a circumferential direction of the hub, the main vanes generating an oblique flow of the crude oil; and
    splitter vanes which are formed on the rear stage section so as to be in connection with an outer surface of the rear stage section, and are arranged at intervals in the circumferential direction of the hub, the splitter vanes generating an axial flow of the crude oil,
    wherein the motor shaft includes a flow path forming shaft portion having a lower end surface, which is allowed to reach underground crude oil, and a first connection portion connected to the lower end of the pump shaft,
    wherein the flow path forming shaft portion includes a first flow path, a lower end of which reaches the lower end surface of the flow path forming shaft portion and a top end of which is disposed below the first connection portion,
    wherein the first connection portion includes a plurality of second flow paths, a lower end of each of which is connected to the top end of the first flow path, the plurality of second flow paths extend obliquely upward, and upper ends of which are exposed from an outer peripheral surface of the first connection portion, and
    wherein the first flow path is a first axial bore extending to a closed end, and the plurality of second flow paths are connected at the closed end.

2. The pump according to claim 1,
    wherein the outer surface of the rear stage section is formed so that an outer diameter of the rear stage section is enlarged from the front stage toward a maximum position, of which the outer diameter of the rear stage section is the maximum value, in a direction of the axis, and is reduced as being separated from the maximum position rearward in the direction of the axis,
    the splitter vanes are arranged at an area of the rear stage section including the maximum position, and
    the outer surface of the front stage section is formed so that the outer diameter of the front stage section is reduced in the direction from the rear stage section to the axis.

3. The pump according to claim 1,
    wherein the lower end surface of the flow path forming shaft portion is protruded below the motor stator.

4. The pump according to claim 1,
    wherein the splitter vanes are positioned so as to be shifted with respect to the main vanes in the circumferential direction of the hub.

5. The pump according to claim 1,
    wherein the number of the splitter vanes is larger than the number of the main vanes.

6. A pump for pumping crude oil from underground, the pump comprising:
    an inner element which includes a plurality of impellers, a pump shaft extending in a vertical direction and having the plurality of the impellers arranged in the vertical direction, a motor shaft having an upper end connected to a lower end of the pump shaft and extending below the pump shaft, a magnetic component provided on an outer peripheral surface of the motor shaft, and a pump stator formed in a tubular shape accommodating the plurality of impellers therein and extending in the same direction as the pump shaft;
    a production pipe formed in a tubular shape extending in the vertical direction, accommodates the inner element therein, and supports the inner element; and
    a motor stator disposed in a lower portion of the production pipe and included in an electric motor together with the magnetic component,
    wherein each of the impellers comprises:
    a hub which is formed in a circular shape centered on an axis, includes a rear stage section and a front stage section inclined in a direction from the rear stage section to the axis, and is rotatable around the axis;
    main vanes which are formed from the front stage section to the rear stage section so as to be in connection with an outer surface of the hub, and are arranged at intervals in a circumferential direction of the hub, the main vanes generating an oblique flow of the crude oil; and
    splitter vanes which are formed on the rear stage section so as to be in connection with an outer surface of the rear stage section, and are arranged at intervals in the circumferential direction of the hub, the splitter vanes generating an axial flow of the crude oil,
    wherein the motor shaft includes a flow path forming shaft portion having a lower end surface, which is allowed to reach underground crude oil, and a first connection portion connected to the lower end of the pump shaft,
    wherein the flow path forming shaft portion includes a first flow path, a lower end of which reaches the lower end surface of the flow path forming shaft portion and a top end of which is disposed below the first connection portion,
    wherein the first connection portion includes a plurality of second flow paths, a lower end of each of which is connected to the top end of the first flow path, the plurality of second flow paths extend obliquely upward, and upper ends of which are exposed from an outer peripheral surface of the first connection portion, and
    wherein the first flow path is a first axial bore extending to a closed end, and the plurality of second flow paths are connected at the closed end.

7. The pump according to claim 6,
    wherein the outer surface of the rear stage section is formed so that an outer diameter of the rear stage section is enlarged from the front stage toward a maximum position, of which the outer diameter of the rear stage section is the maximum value, in a direction of the axis, and is reduced as being separated from the maximum position rearward in the direction of the axis, the splitter vanes are arranged at an area of the rear stage section including the maximum position, and the outer surface of the front stage section is formed so that the outer diameter of the front stage section is reduced in the direction from the rear stage section to the axis.

8. The pump according to claim 6, wherein the lower end surface of the flow path forming shaft portion is protruded below the motor stator.

9. The pump according to claim 6, wherein the splitter vanes are positioned so as to be shifted with respect to the main vanes in the circumferential direction of the hub.

10. The pump according to claim 6, wherein the number of the splitter vanes is larger than the number of the main vanes.

\* \* \* \* \*